United States Patent
Chen et al.

(10) Patent No.: US 7,666,232 B2
(45) Date of Patent: *Feb. 23, 2010

(54) REACTIVE TRICHROMATIC DYE SET

(75) Inventors: Wen-Jang Chen, Taoyuan Hsien (TW);
Bao-Kun Lai, Taoyuan Hsien (TW);
Te-Chin Sung, Taoyuan Hsien (TW);
Cheng-Hsiang Hsu, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 180 days.

This patent is subject to a terminal disclaimer.

(21) Appl. No.: 11/472,359

(22) Filed: Jun. 22, 2006

(65) Prior Publication Data

US 2007/0094813 A1        May 3, 2007

(30) Foreign Application Priority Data

Oct. 27, 2005    (CN)    ......................... 2005 1 0114694

(51) Int. Cl.
*C09B 62/02*    (2006.01)
(52) U.S. Cl. ....................... 8/636; 8/546; 8/638; 8/642; 8/667; 8/670; 8/682
(58) Field of Classification Search ............. 8/642–696, 8/543, 546, 636, 638
See application file for complete search history.

(56) References Cited

U.S. PATENT DOCUMENTS

| | | | |
|---|---|---|---|
| 5,358,558 A * | 10/1994 | Yamamoto et al. | 106/31.47 |
| 6,815,536 B2 | 11/2004 | Huang et al. | 534/612 |
| 7,282,070 B2 * | 10/2007 | Chen et al. | 8/667 |
| 2003/0097721 A1 * | 5/2003 | Schmiedl et al. | 8/445 |
| 2003/0116058 A1 * | 6/2003 | Hopper et al. | 106/31.43 |

FOREIGN PATENT DOCUMENTS

JP        P3168624        3/2001

OTHER PUBLICATIONS

Cho et al. "Reactive dyeing systems for wool fibres based on heterobifunctional reactive dyes. Part 1: Application of comercial reactive dyes." Color. Technol., 118, pp. 198-204, 2002.*

* cited by examiner

*Primary Examiner*—Lorna M Douyon
*Assistant Examiner*—Tri V Nguyen
(74) *Attorney, Agent, or Firm*—Bacon & Thomas, PLLC

(57) ABSTRACT

A reactive trichromatic set comprising (a) at least one of the following reactive red dye of formula (I),

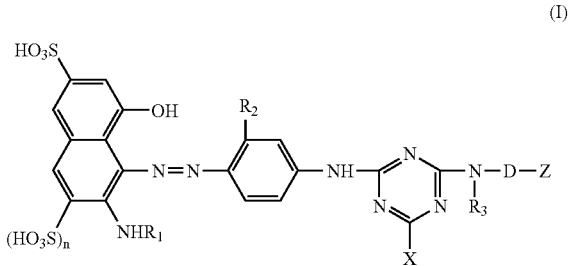

(I)

wherein $R_1$, $R_2$, $R_3$, X, D, Z, and n are defined the same as in the specification; (b) at least one reactive yellow dye selected from the following Color Index; C.I. Reactive Yellow 145 and C.I. Reactive Yellow 176; and (c) at least one reactive blue dye selected from the following Color Index; C.I. Reactive Blue 194, C.I. Reactive Blue 221 and C.I. Reactive Blue 222.

2 Claims, No Drawings

REACTIVE TRICHROMATIC DYE SET

BACKGROUND OF THE INVENTION

1. Field of the Invention

The present invention relates to a reactive trichromatic set suitable for dyeing cellulose fiber and cellulosic blended fibers.

2. Description of Related Art

The reactive trichromatic set is often used in the dyeing of cellulose fibers such as cotton yarn and synthetic fiber. As known by most, in the dyeing of cellulose fiber materials with the use of reactive trichromatic set, it is much satisfying to dye with trichromatic combination of red, yellow and blue reactive trichromatic set in varying ratios.

Nevertheless the developing application for reactive trichromatic set at present is aiming for Right First Time, but the dyestuffs used in trichromatic combination each has dissimilar affinity, reactivity, dyeing rate and temperature dependency, thus exist problems in leveling such as staining during the process of dyeing, or reproducibility such that slight changes in dyeing conditions may result in color difference between dyeing batches. Regarding to the leveling or reproducibility, with the growth in varieties and forms of fiber materials in recent years as well as the automation of the dyeing plants, the process is simplified thereby allowing a shorter dyeing time, and having said that it is also hoping for reactive trichromatic set having better leveling or reproducibility. Even though the said problems have been discussed intensively for solutions (For example, Japanese Patent No. 3168624), however the solutions are not yet satisfying.

To overcome the shortcomings exposed above the present inventors heavily contributed for solutions to resolve the problems associated with dyeing and printing. It is then realized that with the use of reactive trichromatic set having specific red reactive dye, specific yellow reactive dye and specific blue reactive dye allow cellulose fibers to have satisfying leveling and reproducibility.

Further, movements in sports leisurewear have becoming more popular over the years; accordingly color fastness relating to perspiration and light emerge for their importance. The dyestuffs of the present invention consisting of high light fastness and perspiration-light fastness, thus enhances the practical value of the present invention.

SUMMARY OF THE INVENTION

The present invention provides a reactive trichromatic set suitable for dyeing cellulose fiber or cellulosic blended fibers. The dyestuffs of the present invention has superior dyeing properties such as reproducibility, and particularly having high light fastness and alkali perspiration light fastness, and improving Right First Time production.

The reactive trichromatic set of the present invention includes:

(a) a reactive red dye of the following formula (I),

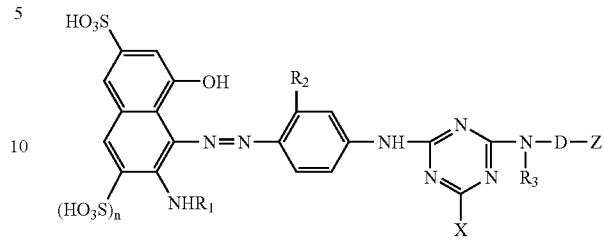

(I)

wherein

X is 3-carboxypyridinium or halogen; wherein preferably X is halogen;

D is phenyl or naphthyl ring having 0 to 3 substituent groups, said substituent groups are independently selected from the groups consisting of halogen atom, $C_{1-4}$ alkyl, $C_{1-4}$ alkoxyl, nitro, amino, hydroxyl, carboxyl, phosphonic acid and sulfo group; wherein preferably D is phenyl ring having 0 to 3 substituent groups;

Z is $-SO_2-CH=CH_2$, $-SO_2-CH_2-CH_2-OSO_3H$ or $-SO_2-CH_2-CH_2-U$; U is Cl, $-SO_2-CBr=CH_2$, $-OPO_3H_2$, $-SSO_3H$ or

wherein preferably X is $-SO_2-CH=CH_2$ or $-SO_2-CH_2-CH_2-OSO_3H$;

$R_1$ is hydrogen atom, $C_{1-4}$ alkyl, phenyl,

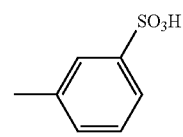

or $C_{1-4}$ alkyl having 1 or more substituent groups, said substituent groups are independently selected from the groups consisting of hydroxyl, carboxyl, sulfo, carbamoyl or methoxy carbonyl;

$R_2$ is sulfo, carboxyl, halogen atom or $C_{1-4}$ alkoxyl; wherein preferably R2 is sulfo;

$R_3$ is hydrogen atom, $C_{1-4}$ alkyl, phenyl,

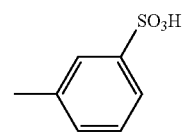

or $C_{1-4}$ alkyl having 1 or more substituent groups; said substituent groups are independently selected from the groups consisting of hydroxyl, carboxyl, sulfo, carbamoyl or methoxy carbonyl; n is an integer of 0 or 1;

(b) A yellow reactive dye selected from the following color index: C.I. Reactive Yellow 145 and C.I. Reactive Yellow 176; and (c) A blue reactive dye selected from the following color index: C.I. Reactive Blue 194, C.I. Reactive Blue 221 and C.I. Reactive Blue 222.

The reactive trichromatic set of the present invention, wherein preferably reactive red dye of formula (I) is the following compound of formula (Ia):

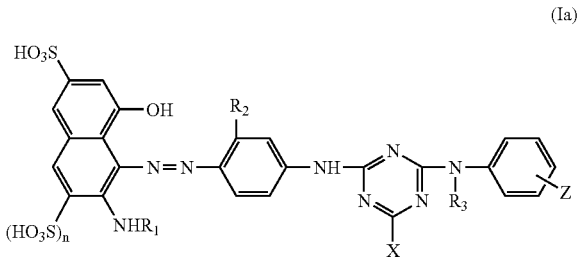

(Ia)

Wherein $R_1$, $R_2$, $R_3$, X, D, Z and n are defined the same as in reactive red dye of formula (I). Examples of reactive red dye of formula (Ia) are the following compounds of formula (2) or formula (3).

tive chromatic dye set of formula (1), wherein an example of cellulose fiber material is cotton.

DETAILED DESCRIPTION OF THE PREFERRED EMOBODIEMENT

The source or preparation relating to the reactive trichromatic set components of the present invention are as followed in the following description.

The preparation of the component (a) reactive red dye of formula (I) is described in the U.S. Pat. No. 6,815,536B2.

The component (b), reactive yellow dye, and component (c) blue reactive dye are commercially available products, and EVERLIGHT CHEMICAL INDUSTRIAL CORP manufactured products are used here.

In the reactive trichromatic set of the present invention, the procedure for dye adding is not critical. For example, one can use separately prepared dye components and mixing in after and then adding the reacting solution during the process, and dried after for the compositions. Other than the above, in a dye bath the dyes can be dissolved together where the compositions in the dye bath is prepared the same as the afore compositions. At the moment the mixing ratio of component (a) red reactive dye and component (b) yellow reactive dye and component (c) blue reactive dye depending on the color hoping to achieve and is not to any limitations. If needed the

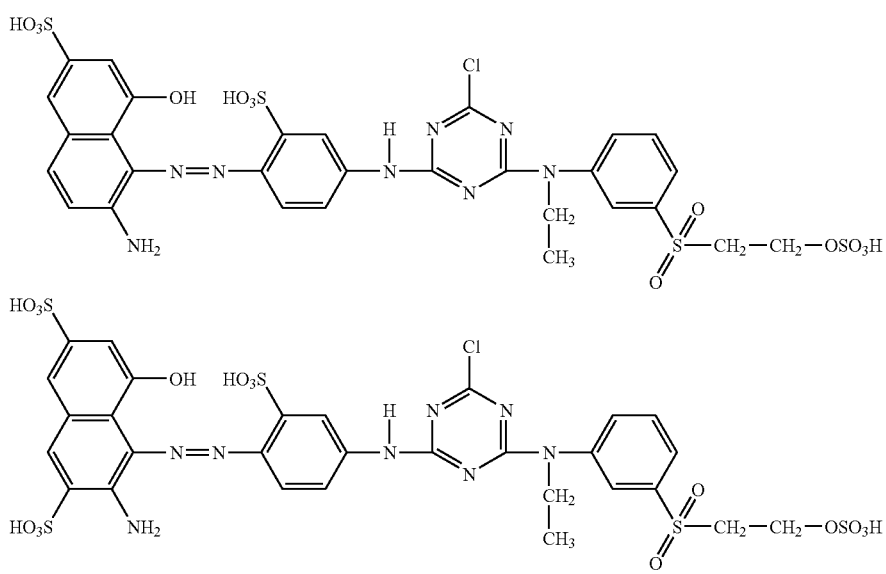

(2)

The reactive trichromatic set of the present invention, wherein component (a) dye is preferably present in an amount ranging from 1 to 97 weight percents, component (b) dye is preferably present in an amount ranging from 1 to 97 weight percents, and component (c) dye is preferably present in an amount ranging from 1 to 97 weight percents.

The reactive trichromatic set of the present invention may exist in the form of acid or salt, especially alkaline metallic salts and alkaline earth metallic salts, and preferably in alkaline metals.

When dyeing or printing cellulose fiber materials with the present invention, the method includes using aqueous solution processed fiber materials having the composition of reaccompositions of the present invention may consist of additives familiar to all such as concentration adjust agents, dispersing agents, leveling agents, precipitation inhibitors, metal ion locked agents, reduction inhibitors, or conventional dyeing-assistants etc.

From the foregoing description the said conditions are: in dyeing liquid, exhaust dyeing liquid, printing paste where they are directly added to form the dyestuff of reactive trichromatic set of the present invention and when dyeing with the aforementioned additives together with the solution, the order for dissolving dyestuffs and additives is not critical. The amount of reagent used may be assessed with respect to the afore.

For convenience in the statement, the compounds are expressed as free acid in the specification. When the dyestuffs of the present invention are mass manufactured or used, they exist in the form of salts, especially alkaline metallic salts, such as sodium salts, lithium salts, potassium salts or ammonium slats, and preferably sodium salts.

The dye compositions of the present invention can dye many kinds of fiber materials such as cellulose fiber materials and cellulosic blended fibers. The cellulose fiber materials are not critical, where these dye compositions can also be used to dye natural cellulose fibers and regenerated cellulose fibers, such as cotton, linen, jute, ramie, mucilage rayon, as well as cellulose based fibers.

In the present invention, the dyeing methods are familiar to most where the dyeing can be preceded by usual or known methods such as the methods exemplified below.

Exhaustion dyeing is applied by mixing the dyeing liquid with the known inorganic neutral salts (e.g. sodium sulfate and sodium chloride) and the known base-binding agents (e.g. sodium carbonate, sodium hydroxide). The amount of inorganic neutral salts and alkali used here is not important. Inorganic neutral salts and alkali can be added into the dyeing bath through traditional methods either at once or several times. In addition, conventional dyeing assistants (e.g. leveling agents, retarding agents, etc.) can be added as well. The range of dyeing temperatures often range from 40° C.~90° C., preferably 50° C.~70° C. The dyeing bath ratio generally ranges from 1:5~1:50 (dye material:dyeing liquid).

In the cold-pad batch dyeing method, dye, base-binding agents and customary auxiliaries are padded from the liquor through. The padded, squeezed substrate is often rolled onto an A-frame and batched at room temperature to allow dye fixation to take place.

In the continuous dyeing, two varying methods exist. In the one-bath padding application, dye, alkali (e.g. sodium carbonate or sodium bicarbonate) and customary auxiliaries are padded from the liquor through, the padded, squeezed substrate is then dried by either baking or steam. In the two bath padding application, the substrate is padded through a dye solution bath, and later processed with the known inorganic neutral salts (e.g. sodium sulfate anhydrate and sodium chloride) and the known base-binding agents (e.g. sodium hydroxide or sodium silicate) bath, then dye fixed by either baking or steam.

In the textile printing, there can be exemplified a method which conducts printing a substrate with printing paste containing, a known acid-binding agent (e.g. sodium bicarbonate), thickener, and completing the dye fixation bye dry heat or steam. The dyeing or printing methods employed in the process of the present invention are not limited to these methods.

The reactive trichromatic set of the present invention has superior reproducibility, light fastness and perspiration-light fastness under balanced affinity, reactivity and compatibility as well improving Right First Time production while having high fixation yield and water washing off for dyeing cellulose fibers or cellulosic blended fibers.

For the convenience in the statement, the following examples are exemplified for a more specific description.

Many examples have been used to illustrate the present invention. The examples sited below should not be taken as a limit to the scope of the invention. In these examples, the compounds are represented in the form of dissolved acid. However, in practice, they are separated in the form of alkaline metallic salts and salts for dyeing.

In the following examples, quantities are given as parts by weight (%) if there is no indication. The relationship between weight parts and volume parts are the same as that between kilogram and liter.

EXAMPLE 1

Providing the following dyestuff compositions:

| | |
|---|---|
| Red reactive dye Dyestuff of formula (2) | 0.12 parts |
| Yellow reactive dye C.I. Reactive Yellow 145 | 0.12 parts |
| Blue reactive dye C.I. Reactive Blue 221 | 0.06 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the $\Delta C$ and $\Delta H$ lie within 0.5 showing high reproducibility and Right First Time ratio greater than 90%.

EXAMPLE 2

Providing the following dyestuff compositions:

| | |
|---|---|
| Red reactive dyestuff Dyestuff of formula (3) | 0.12 parts |
| Yellow reactive dyestuff C.I. Reactive Yellow 145 | 0.12 parts |
| Blue reactive dyestuff C.I. Reactive Blue 221 | 0.06 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the $\Delta C$ and $\Delta H$ lie within 0.5 showing high reproducibility and Right First Time ratio greater than 90%.

EXAMPLE 3

Providing the following dyestuff compositions:

| | |
|---|---|
| Red reactive dyestuff Dyestuff of formula (2) | 0.12 parts |
| Yellow reactive dyestuff C.I. Reactive Yellow 145 | 0.06 parts |
| Blue reactive dyestuff C.I. Reactive Blue 221 | 0.12 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the Δ C and Δ H lie within 0.5 showing high reproducibility and Right First Time ratio greater than 90%.

EXAMPLE 4

Providing the following dyestuff compositions:

| | |
|---|---|
| Red reactive dyestuff Dyestuff of formula (3) | 0.12 parts |
| Yellow reactive dyestuff C.I. Reactive Yellow 145 | 0.06 parts |
| Blue reactive dyestuff C.I. Reactive Blue 221 | 0.12 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the Δ C and Δ H lie within 0.5 showing high reproducibility and Right First Time ratio greater than 90%.

COMPARATIVE EXAMPLE 1

Providing and selecting widely used commercial dye products having high sales volume such as the following dyestuff compositions:

| | |
|---|---|
| Red reactive dyestuff C.I. Reactive Red 195 | 0.12 parts |
| Yellow reactive dyestuff C.I. Reactive Yellow 145 | 0.12 parts |
| Blue reactive dyestuff C.I. Reactive Blue 221 | 0.06 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the Δ C and Δ H are higher than 1.0 meaning poor reproducibility and Right First Time ratio less than 70%.

COMPARATIVE EXAMPLE 2

Providing and selecting widely used commercial dye products having high sales volume such as the following dyestuff compositions:

| | |
|---|---|
| Red reactive dyestuff C.I. Reactive Red 195 | 0.12 parts |
| Yellow reactive dyestuff C.I. Reactive Yellow 145 | 0.06 parts |
| Blue reactive dyestuff C.I. Reactive Blue 221 | 0.12 parts |

The above dye compositions are dissolved in 1000 parts of water, and 30 parts of Glauber's salt and 100 parts of unmercerized cotton cloth are added to subsequently, under a maintained temperature of 60° C. the dyeing liquid is stirred for 30 minutes. Follow up 15 parts of soda ash are added, and dyeing is carried out for an hour while maintaining the temperature at 60° C. After completing dyeing, the cloth is water cleaned, soaping off, and tumbled-dried to obtain the dyed cloth. The same dyeing procedures are repeated for several times, and by comparing the obtained dyed cloths the Δ C and Δ H are higher than 1.0 meaning poor reproducibility and Right First Time ratio less than 70%.

The results of the dyeing characteristic tests are shown in the following table.

Comparison of light fastness: Testing methods corresponding to ISO 105 B02

| Trichromatic Composites | Example 1 | Example 2 | Example 3 | Example 4 | Comparative example 1 | Comparative example 2 |
|---|---|---|---|---|---|---|
| Light Fastness | 5 | 5-6 | 5 | 5-6 | 3-4 | 3-4 |

Comparison of alkali perspiration light fastness: Testing methods corresponding to Modified ISO 105 B02 & E04.

| Trichromatic Composites | Example 1 | Example 2 | Example 3 | Example 4 | Comparative example 1 | Comparative example 2 |
|---|---|---|---|---|---|---|
| Alkali Perspiration Light Fastness | 5 | 5-6 | 5 | 5-6 | 3-4 | 3-4 |

Comparison of dyestuff compatibility and dyeing reproducibility:

| Trichromatic/Preparation Change | L.R. = 1:6 Salt = 26.7 g/l Alkali = 13.3 g/l | | L.R. = 1:8 Salt = 20.0 g/l Alkali = 10.0 g/l | | L.R. = 1:10 Salt = 16.0 g/l Alkali = 8.0 g/l | | L.R. = 1:12 Salt = 13.3 g/l Alkali = 6.7 g/l | | L.R. = 1:6 Salt = 20.0 g/l Alkali = 10.0 g/l | |
|---|---|---|---|---|---|---|---|---|---|---|
| Condition/DE&DC | DH | DE | DH | DE | DH | DE | DH | DE | DH | DE |
| Example 1 | 0.26 | 0.35 | As control | | −0.12 | 0.14 | −0.23 | 0.31 | 0.04 | 0.16 |
| Example 2 | −0.31 | 0.32 | As control | | 0.52 | 0.53 | 0.86 | 0.89 | −0.11 | 0.30 |
| Comparative example 1 | −0.60 | 0.70 | As control | | 1.13 | 1.14 | 0.94 | 0.95 | −0.28 | 0.31 |

The series of dye set of the present invention are suitable for dyeing cellulose fibers with excellent properties. The practiced dyeing methods are the general methods for dyeing reactive dyestuffs, examples of are exhaustion dyeing, printed-dyeing, or continuous dyeing.

The series of dye set described in the present invention are water-soluble dyestuffs having high commercial values. With the use of the dye set of the present invention reactive trichromatic set under balanced affinity and reactivity are characterized with satisfactory reproducibility, leveling, washing off and toughness particularly high light fastness and light-perspiration fastness, and as well improving Right First Time production, for dyeing cellulose fibers or cellulosic blended fibers can be obtained.

From the foregoing description, one skilled in the art can easily ascertain the essential characteristics of this invention, and without departing from the scope thereof, one can make various changes and modifications of the invention to adapt it to various usages and conditions. Thus other embodiments are also within the claim.

What is claimed is:

1. A reactive trichromatic set comprising components (a) (b) and (c) wherein:

component (a) is reactive red dye (2)

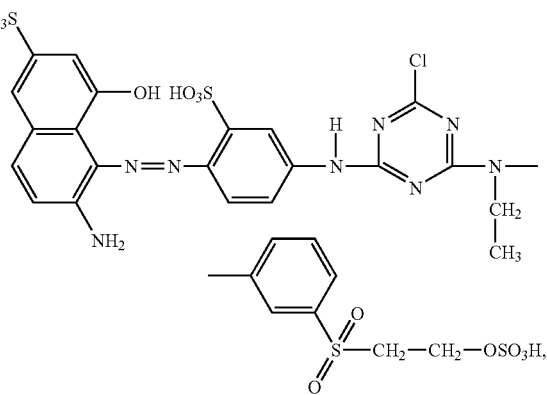

(2)

Component (b) is reactive yellow dye having a color index C.I. Reactive Yellow 145; and Component (c) is reactive blue dye having the color index C.I. Reactive Blue 221.

2. The reactive trichromatic set of claim 1, wherein the component (a) dye is present in an amount ranging from 1 to 97 weight percent, the component (b) dye is present in an amount ranging from 1 to 97 weight percent, and the component (c) dye is present in an amount ranging from 1 to 97 weight percent.

* * * * *